United States Patent
Hildreth et al.

(10) Patent No.: US 11,796,437 B2
(45) Date of Patent: Oct. 24, 2023

(54) MEASURING DENSITY VIA PRESSURE SENSOR IN A CONDUIT

(71) Applicant: Brine Masters, LLC, Carmel, IN (US)

(72) Inventors: Clay Hildreth, Carmel, IN (US); Christopher Robert Thomas, Raleigh, NC (US)

(73) Assignee: BRINE MASTERS, LLC, Carmel, IN (US)

( * ) Notice: Subject to any disclaimer, the term of this patent is extended or adjusted under 35 U.S.C. 154(b) by 0 days.

(21) Appl. No.: 17/364,017

(22) Filed: Jun. 30, 2021

(65) Prior Publication Data

US 2021/0404930 A1 Dec. 30, 2021

Related U.S. Application Data

(60) Provisional application No. 63/143,356, filed on Jan. 29, 2021, provisional application No. 63/046,332, filed on Jun. 30, 2020.

(51) Int. Cl.
*G01N 9/00* (2006.01)

(52) U.S. Cl.
CPC ........................ *G01N 9/00* (2013.01)

(58) Field of Classification Search
CPC ..... G01F 1/34; G01F 1/86; G01N 2011/0013; G01N 9/00; G01N 9/02; G01N 9/04
See application file for complete search history.

(56) References Cited

U.S. PATENT DOCUMENTS

| | | | |
|---|---|---|---|
| 7,366,621 B2 | 4/2008 | Sprague |
| 7,810,987 B2 | 10/2010 | Hildreth |
| 8,251,569 B2 | 8/2012 | Hildreth |
| 8,382,364 B2 | 2/2013 | Hildreth |
| 8,870,444 B2 | 10/2014 | Hildreth |
| 9,156,013 B2 | 10/2015 | Hildreth et al. |
| 10,376,854 B2 | 8/2019 | Hildreth et al. |
| 10,544,340 B2 | 1/2020 | Nesheim et al. |
| 10,766,010 B2 | 9/2020 | Nesheim et al. |

(Continued)

FOREIGN PATENT DOCUMENTS

| | | |
|---|---|---|
| KR | 10-0851776 | 8/2008 |
| WO | WO 2009/123456 A2 | 10/2009 |

OTHER PUBLICATIONS

Henderson Products, Inc., "Henderson BrineXtreme Infinity Demonstration", uploaded to YouTube on Jul. 18, 2018, pp. 1-21, Uploaded by "Henderson Products" YouTube account, Available at https://www.youtube.com/watch?v=j1RX2x-9Fn4.

*Primary Examiner* — Feba Pothen
*Assistant Examiner* — Martin Walter Braunlich
(74) *Attorney, Agent, or Firm* — Crowell & Moring LLP

(57) ABSTRACT

Methods and systems are provided to detect a density and/or a concentration of a brine solution or any other solution flowing in a conduit. A diverted portion of the brine solution may be received from the conduit at a vertical pipe. The vertical pipe has a top and a bottom, where the diverted portion of the brine solution is received at the bottom of the vertical pipe and the top of the vertical pipe is at atmospheric pressure. A pressure sensor may detect a pressure of the brine solution in the vertical pipe. A processor may determine the density and/or the concentration of the brine solution based on the detected pressure of the brine solution and a property of a reference solution.

20 Claims, 2 Drawing Sheets

(56) References Cited

U.S. PATENT DOCUMENTS

| | | |
|---|---|---|
| 10,960,363 B2 | 3/2021 | Hildreth et al. |
| 2001/0054308 A1* | 12/2001 | Komiya .................. G01N 9/26 73/61.71 |
| 2009/0092001 A1 | 4/2009 | Hildreth et al. |
| 2017/0097295 A1* | 4/2017 | Verbanck ................ G01F 15/02 |
| 2020/0041481 A1* | 2/2020 | Burgess .................. G01N 7/00 |
| 2021/0178343 A1 | 6/2021 | Hildreth et al. |

* cited by examiner

MEASURING DENSITY VIA PRESSURE SENSOR IN A CONDUIT

CROSS-REFERENCE TO RELATED APPLICATIONS

This application is a non-provisional of, and claims priority under 35 USC § 119(e) to, U.S. Provisional Application 63/046,332, filed Jun. 30, 2020 and U.S. Provisional Application 63/143,356, filed Jan. 29, 2021. The entire contents of each of the above-identified applications are hereby incorporated by reference.

TECHNICAL FIELD

This application relates to sensors and, in particular, to a sensor for measuring density.

BACKGROUND

Present density measuring systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

It may be useful for process control in an automated in-line process to measure the concentration of a substance in a solution in a flowing pipe. There are a variety of methods and conventional products to measure the concentration of a substance in a flowing solution. Examples of such methods and products include refraction, conductivity, and density meters of various types. In particular, in order to obtain an accurate measurement of the solution density and/or concentration in an automated process where a predetermined concentration of a solution is desired, it is helpful to accurately measure the concentration of the process solution.

Conventional sensors that measure solution density and/or concentration may be problematic due to insufficient durability, relatively high cost, inaccuracy issues, and a lack of temperature compensation. A first set of novel systems described herein include a single pressure sensor configured to measure a pressure of a column height of solution flowing through a vertical pipe at a substantially fixed flow rate. A substantially fixed flow rate is a flow rate that falls within 5 percent of a target flow rate. A second set of novel systems described herein include a single pressure sensor configured to periodically measure the pressure of a column height of a non-flowing solution in a vertical pipe. In addition, the systems may equate or convert the pressure of the column height to density, and use temperature to compensate the density reading to obtain a relatively accurate, temperature compensated density (and/or concentration) of the solution relative to a baseline of a known value or solution.

Figure 1:
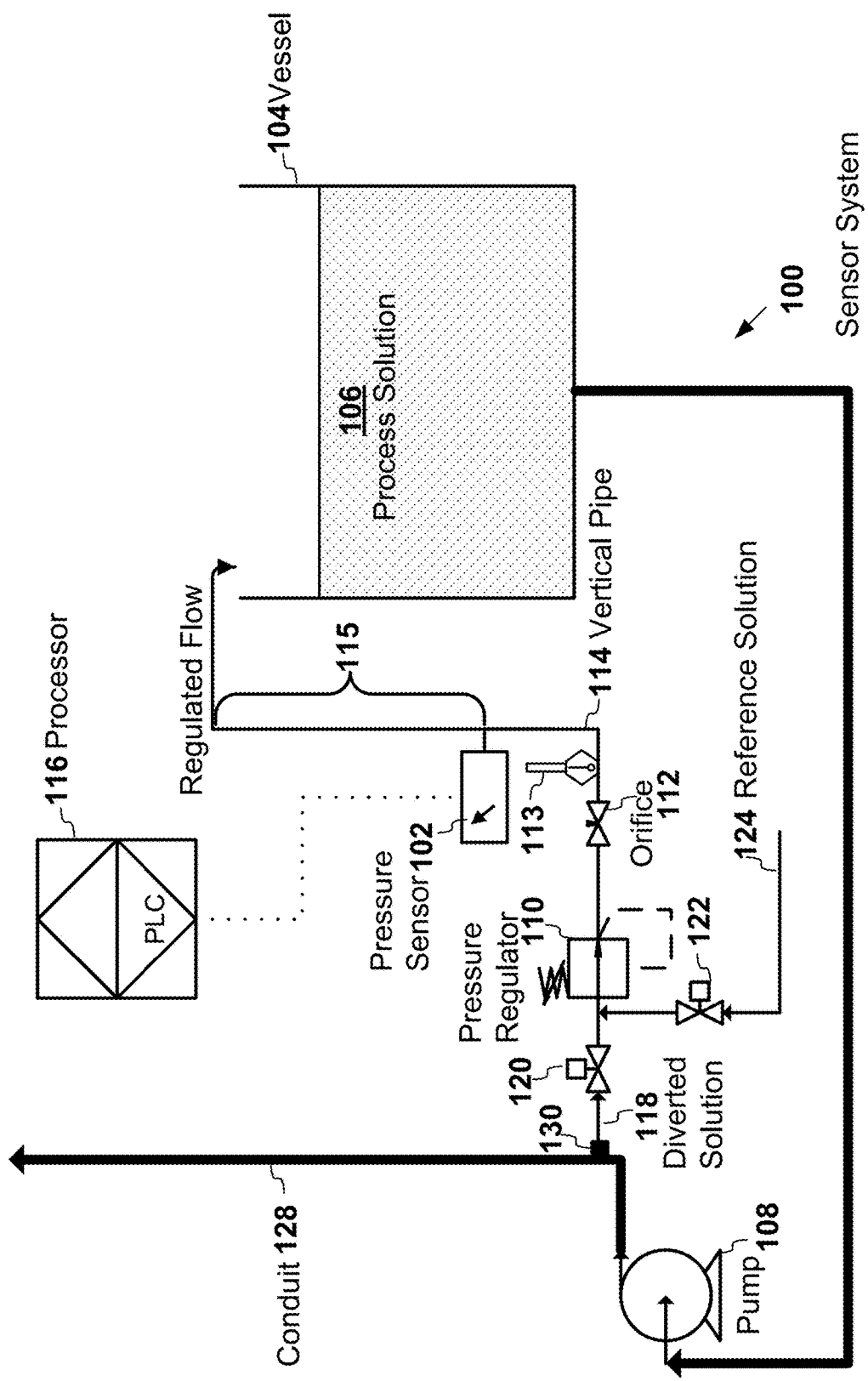
FIG. 1 illustrates a first example of sensor system to measure solution density and/or concentration as a diverted portion of a process solution flows through a vertical pipe.

FIG. 1 illustrates an example of a novel sensor system 100 to measure solution density and/or concentration that uses a single pressure sensor 102. The sensor system 100 shown in FIG. 1 includes the pressure sensor 102, a vessel 104 of a process solution 106, a pump 108, a joint 130, a pressure regulator 110, a fixed orifice 112, a temperature sensor 113, a vertical pipe 114, and a processor 116. The sensor system 100 is able to measure the density and/or concentration of the process solution 106 as the process solution 106 flows through a conduit 128.

The pump 108 is configured to pump the process solution 106 from the vessel 104 into the conduit 128. The joint 130 is configured to branch off a diverted portion 118 of the process solution 106 that flows through the conduit 128. The diverted portion 118 of the process solution 106 is referred to herein as the diverted solution 118. The pressure regulator 110 is configured to receive the diverted solution 118. The fixed orifice 112 is in a conduit that fluidly connects the pressure regulator 110 to the bottom of the vertical pipe 114. The top of the vertical pipe 114 is configured to empty into the vessel 104. The single pressure sensor 102, such as a pressure transducer or a pressure transmitter, is arranged to measure the pressure of the diverted solution 118 at the bottom of a column height 115 of the diverted solution 118. The column height 115 of the diverted solution 118 is fixed. Any height may be selected, but increasing the column height 115 may increase the accuracy the density measurements in some examples.

The temperature sensor 113 is arranged to measure the temperature of the diverted solution 118 that is in and/or entering the vertical pipe 114. An example of the temperature sensor 113 includes a thermocouple.

The pressure sensor 102 may be any device capable of measuring the pressure of a fluid in a conduit. Examples of the single pressure sensor 102 include a pressure transducer and a pressure transmitter. The pressure measured is a gauge pressure. The sensor system 100 that includes the single pressure sensor 102 may be advantageous over other density measuring systems that require multiple pressure sensors to detect density because multiple pressure sensors introduce additional variances, decreased reliability, and/or increased costs.

The vessel 104 may be any container of the process solution 106. Examples of the vessel 104 may include a tank or any other type of storage container for a fluid. The vessel 104 may be open at the top as shown. Alternatively, the top of the vessel 104 may be at least partially enclosed. In any case, the vessel 104 into which the vertical pipe 114 empties is at atmospheric pressure. As a result, the top of the vertical pipe 114 may be at atmospheric pressure.

The process solution 106 may be any solution. An example of the process solution 106 includes a brine solution, which is a salt solution. In some examples, the process solution 106 may include particulate matter such as undissolved salt particles and/or dirt. In some examples, a brine maker (not shown) may generate the process solution 106. Alternatively or in addition, the pump 108 may pump the process solution 106 to and/or from a storage tank (not shown).

The pressure regulator 110 is a valve that controls the pressure of a fluid or gas exiting the valve to have a target pressure. An example of the pressure regulator 110 is a pressure reducing regulator.

The orifice 112 may include any opening that has a smaller width than the width of an outlet of the pressure regulator 110. Examples of the orifice 112 include a restriction in a conduit and a valve. The orifice 112 may have a fixed size. Alternatively, the size of the orifice 112 may be adjustable.

The vertical pipe 114 may be any conduit arranged so that fluid flowing through the conduit travels vertically. The vertical pipe 114 may have any shape. Consequently, the vertical pipe 114 may be in the shape of a cylinder, a rectangular cuboid, or any other three-dimensional shape. In addition, the vertical pipe 114 may not be perfectly vertical. For example, the vertical pipe 114 may be at an acute angle relative to the direction of the force of gravity. In some examples, any fluid flowing up the vertical pipe 114 may flow primarily in a vertical direction but may also travel in a horizontal direction. The pressure sensor 102 may be configured to measure the pressure of the column height 115 of the diverted solution 118 at a position substantially below the discharge point of the conduit that includes the vertical pipe 114. The orientation of the vertical pipe 114 is to be fixed relative to the force of gravity. Accordingly, the top and the bottom of the vertical pipe 114 are understood to be relative to the direction of gravity. That is, the bottom is in the direction of gravity and the top is in the opposite direction of gravity.

The joint 130 may be any structure which is configured to redirect a portion of any liquid that flows through the conduit 128. Alternatively or in addition, the joint 130 may be any component that fluidly couples the conduit 128 through which the process solution 106 flows to a portion of the sensor system 100 that includes the vertical pipe 114. Examples of the joint 130 may include a Y-joint, a T-joint, and or any other type of joint.

In some examples, the sensor system 100 may further include a sensor valve 120 configured to turn the flow of the diverted solution 118 on or off, and a calibration valve 122 configured to turn a flow of a reference solution 124 on or off. The sensor valve 120 and/or the calibration valve 122 may be a manual valve. Alternatively or in addition, the sensor valve 120 and/or the calibration valve 122 may be in communication with, and controllable by, the processor 116. The sensor valve 120 and/or the calibration valve 122 may be any valve that controls a flow of fluid through the valve. Examples of the sensor valve 120 and/or the calibration valve 122 include an on/off valve, a flow control valve, and/or an actuated valve.

As explained below, the sensor system 100 shown in FIG. 1 is configured to cause a fixed flow rate of the diverted solution 118 through the vertical pipe 114 even when variances in system pressure are present. The system pressure in the example shown in FIG. 1 is the pressure of the process solution 106 exiting the pump 108. The system pressure may vary when, for example, the pump speed changes. The fixed flow rate of the diverted solution 118 through the vertical pipe 114 is obtained in part by using the pressure regulator 110 to reduce the pressure of the diverted solution 118 flowing to the vertical pipe 114. The diverted solution 118 is a portion of the process solution 106 that flows through the conduit 128. The flow rate of the diverted solution 118 may be relatively small compared to the flow rate of the process solution 106 exiting the pump 108. The target pressure of the pressure regulator 110 may be set to a value lower than the minimum system pressure to ensure that the regulated pressure is substantially constant regardless of system pressure.

As a result of the diverted solution 118 flowing through the pressure regulator 110 and the orifice 112, the diverted solution 118 becomes a pressure regulated solution downstream of the orifice 112. Generating the pressure regulated solution enables the vertical pipe 114 to have a substantially constant flow rate of the diverted solution 118. The constant flow rate enables measurement of column height pressure, which may form the basis of calculating the density of the diverted solution 118. Because of the constant flow rate, the pressure drop of the diverted solution 118 in the vertical pipe 114 becomes a constant or substantially constant. As a result, the pressure sensor 102, in combination with the processor 116 (for example, a Programmable Logic Controller), may accurately measure the pressure at a constant flow rate. Consequently, the single pressure sensor 102 is able to accurately determine the density and/or concentration of the process solution 106 from the measured pressure as described in more detail further below.

During a calibration phase of the sensor system 100, the processor 116 determines a base line (K factor) of a reference solution 124 having a known density and/or concentration. Examples of the reference solution 124 include water or any other solution of known density and/or concentration. Having a K factor of a known solution, such as water, enables the sensor system 100 to accurately measure the density of the process solution 106 without having the need for precision components or having variability of sensors, pressure regulators, and column height of the vertical pipe as well as other restrictions that may occur in the flow path of the process solution 106. The K factor of a known solution at a fixed flow rate is recorded by, or provided to, the processor 116 in order to obtain a temperature compensated K factor for calculating density.

To determine the K factor, the processor 116 may cause the sensor valve 120 to close, and the calibration valve 122 to open. In such a scenario, the reference solution 124 instead of the process solution 106 may flow through the pressure regulator 110 and the orifice 112, and subsequently, up the vertical pipe 114 at a substantially constant flow rate. As the reference solution 124 flows at the substantially constant flow rate through the vertical pipe 114, the temperature sensor detects the temperature Kt of the reference solution 124 and the pressure sensor 102 detects the pressure Kp of the reference solution 124. The thermal expansion coefficient Ke of the reference solution 124 at a base line temperature Kb are known. For example, the coefficient of water (Ke) is $210 \times 10^{-6}$ at 20° C. (Kb). The K factor may be determined by the processor 116 according to the following formula:

$$K \text{ factor} = Kp/[1-(Kt-Kb)*Ke]$$

During a density and/or concentration detection mode of sensor system 100, the processor 116 may cause the sensor valve 120 to open, and the calibration valve 122 to close. In this detection mode, the process solution 106 flows through the pressure regulator 110 and the orifice 112, and subsequently, up the vertical pipe 114 at a substantially constant flow rate. As the process solution 106 flows at the substantially constant flow rate through the vertical pipe 114, the temperature sensor 113 detects the temperature Pt of the process solution 106 and the pressure sensor 102 detects the pressure Pp of the process solution 106. The pressure sensor 102 may communicate a process variable of the pressure sensor 102, which is indicative of the pressure Pp, to the processor 116. The temperature sensor 113 may communicate the temperature Pt, or a process variable indicative thereof, to the processor 116. The processor 116 may compare the pressure Pp to the K factor of the reference solution 124 in order to calculate the density and/or concentration of the process solution 106. Because the density of the process solution 106 changes with temperature, the processor 116 may adjust the detected density based on temperature using a known value of the thermal expansion properties of the process solution 106.

The following equation provides an example of an equation with calibration (K factor) of the reference solution 124 that the processor 116 may apply in order to calculate a temperature compensated specific gravity (Psg) of the process solution 106.

Psg: Process Solution Specific Gravity
Kt: Reference solution temperature
Kp: Reference solution Pressure
Ke: Reference solution thermal expansion coefficient
Kb: Reference solution base line temperature of thermal expansion
Pt: Process Solution temperature
Pp: Process Solution Pressure
Pe: Process Solution thermal expansion coefficient
Pb: Process Solution base line temperature of thermal expansion $$(((Pb-Pt)*Pe)*Pp*-1) + \frac{Pp}{\frac{Kp}{(1-(Kt-Kb)*Ke)}} = Psg$$

The denominator in the equation immediately above is the K factor described further above. The specific gravity (Psg) of the process solution 106 may be considered to be equivalent to the density of the process solution 106. Alternatively, the processor 116 may calculate the density from the specific gravity (Psg) of the process solution 106 by multiplying the specific gravity (Psg) by the density of the reference solution 124 at the temperature (Pt) of the process solution 106. Because the specific gravity and the density of the process solution 106 also are dependent on a concentration of a substance in the process solution 106 (for example, salt), the determined specific gravity and/or density of the process solution 106 may also be the determination of the concentration of a substance in the process solution 106.

The processor 116 may be configured to, for example:
1. Determine delta P of the process solution 106 (specifically, the diverted solution 118) relative to the reference solution 124 (water or other known solution) to derive Sg (specific gravity) of the process solution 106 (non-temperature compensated).
2. Compensate for temperature from the known concentration and process solution in order to determine the actual density of the process solution 106 solution via one or more equations in the processor 116.
3. Convert the Process Sg (specific gravity) to common measurement unit (s) such as BRIX, Wt./Wt. and/or Salometer of the process solution 106.
4. Use Process Sg or Process Sg converted to the common measurement unit(s) for control and/or monitoring of the process solution 106 in an automated process to produce a solution at a desired (target or predetermined) concentration. For example, the sensor system 100 may provide the Process Sg or Process Sg converted to the common measurement unit(s) to another system to monitor and control the density of a brine solution produced by a brine maker.

A mechanical method may be provided to maintain a substantially constant flow through the fixed column height conduit. This may be achieved via maintaining a constant pressure through the orifice 112, thus regulating flow to a substantially constant and predictable rate. The pressure regulator 110 may maintain the substantially constant pressure at a pressure that is less than the pumping system's minimum operating pressure.

Figure 2:
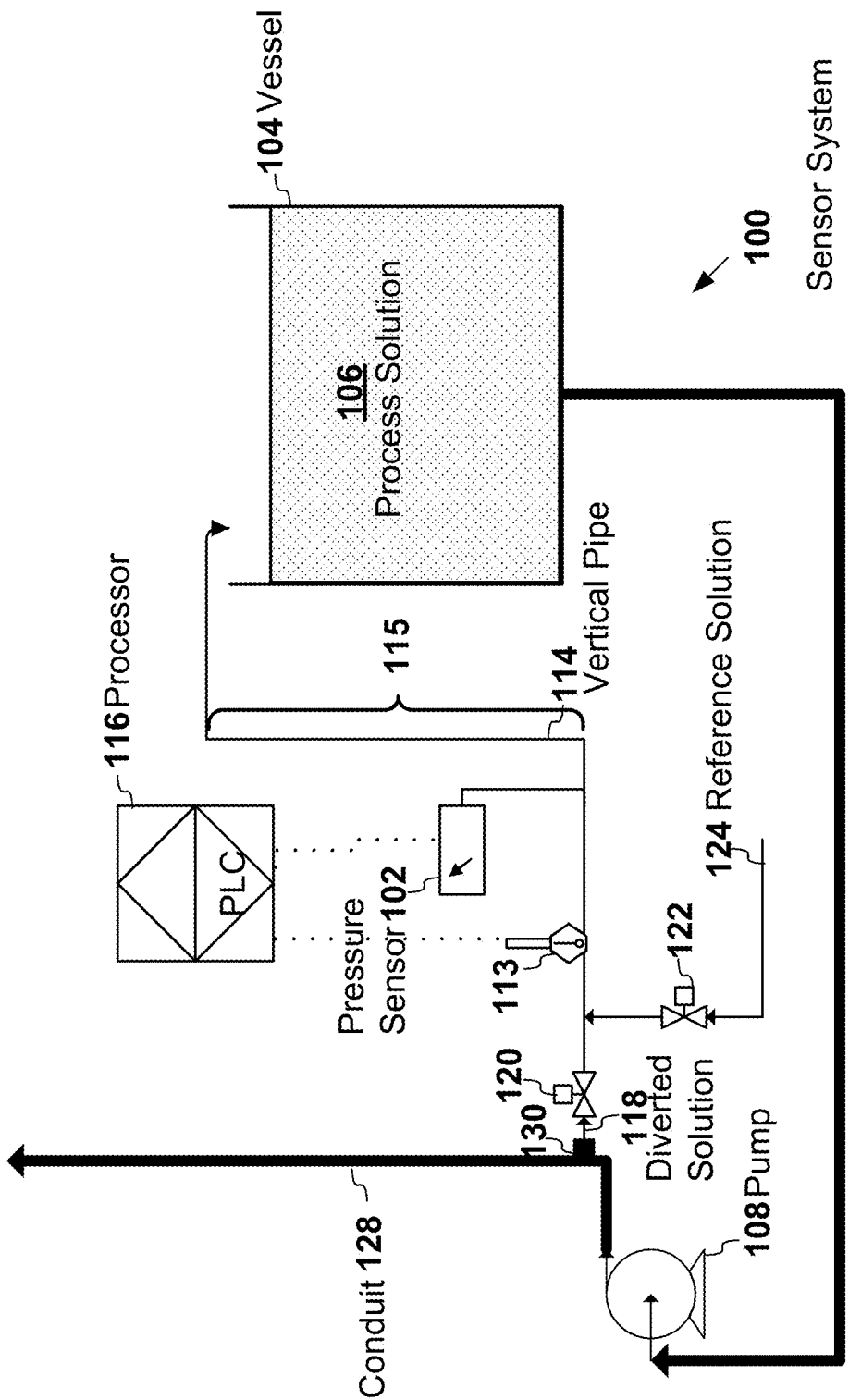
FIG. 2 illustrates a second example of sensor system to measure solution density and/or concentration while a diverted portion of a process solution stands in a vertical pipe.

FIG. 2 illustrates a second example of the sensor system 100 to measure the density and/or concentration of the process solution 106 using the single pressure sensor 102. The sensor system 100 illustrated in FIG. 2 includes the pressure sensor 102, the vessel 104, the pump 108, the conduit 128, the joint 130, the sensor valve 120, the calibration valve 122, the temperature sensor 113, the pressure sensor 102, and the vertical pipe 114. The sensor system 100 is able to measure the density and/or concentration of the process solution 106 as the process solution 106 flows through the conduit 128.

The pump 108 is configured to pump the process solution 106 from the vessel 104 into the conduit 128. The joint 130 is configured to branch off the diverted portion 118 of the process solution 106 that flows through the conduit 128. The sensor valve 120 is configured to receive the diverted solution 118, and selectively supply the diverted solution 118 to the bottom of the vertical pipe 114. The flow rate of the diverted solution 118 may be relatively small compared to the flow rate of the process solution 106 exiting the pump 108. The top of the vertical pipe 114 is configured to empty into the vessel 104. Similar to the sensor system 100 shown in FIG. 1, the single pressure sensor 102 is arranged to measure the pressure of the diverted solution 118 at the bottom of the column height 115 of the diverted solution 118, and the temperature sensor 113 is configured to measure the temperature of the diverted solution 118 in the vertical pipe.

However, in contrast to the sensor system 100 shown in FIG. 1, the processor 116 causes the sensor valve 120 to close, and then delay for a time period in order to permit the flow of the diverted solution 118 to come to a stop in the vertical pipe 114 before the temperature sensor 113 detects the temperature (Pt) of the process solution 106 and before the pressure sensor 102 detects the pressure (Pp) of the process solution 106. For example, the delay may be 2-4 seconds after the sensor valve 120 is closed. In other examples, delays other than 2-4 seconds after the sensor valve 120 is closed may be instituted. In some examples, the processor 116 obtains multiple temperature and/or pressure readings and averages the readings to obtain the temperature (Pt) of the process solution 106 and the pressure (Pp) of the process solution 106.

The process described above may be repeated periodically. Stated differently, the sensor system 100 may cause a periodic charging of the diverted solution 118 in the vertical pipe 114 by opening and closing the sensor valve 120. After the vertical pipe 114 is charged with the diverted solution 118, a pressure reading is recorded. The system pressure in the example shown in FIG. 2 is the pressure of a fluid in the vertical pipe 114. The diverted solution 118 is fluid taken from the fluid exiting the pump 108. The flow rate of the diverted solution 118 may be a fraction of the fluid exiting the pump 108. The sensor valve 120 controls flow to the vertical pipe 114 in order to charge the vertical pipe 114 with the process solution 106 for the process measurement. The sensor valve 120 is in communication with the processor 116, so the processor 116 may cause the sensor valve 120 to open and/or close. The processor 116 may cause the sensor valve 120 to be open for a first predetermined amount time, and closed a second predetermined amount of time. This process enables the vertical pipe 114 to be charged with the process solution 106 on an ongoing basis, thereby enabling the sensor system 100 to measure a static pressure of the static column height 115 of the process solution 106.

Using the same mechanism described above in connection with the sensor system 100 shown in FIG. 1, the processor 116 may accurately determine the density and/or concentration of the process solution 106 based on the temperature (Pt) of the process solution 106 and the pressure (Pp) of the process solution 106.

The sensor system 100 may include more, fewer, or different elements than shown in FIGS. 1 and/or FIG. 2. For example, the vessel 104, the pump 108, and the conduit 128 may be part of a different system than the sensor system 100. For example, these components may be part of a brine maker and/or a delivery system.

In some examples, the sensor system 100 may not include calibration components such as the calibration valve 122. Instead, the sensor system 100 may rely on predetermined values for Kp, Ke, and Kb. The predetermined values for Kp, Ke, and Kb may be theoretically calculated and/or determined experimentally.

FIGS. 1 and 2 provide examples of the pressure sensor 102 and the temperature sensor 113 being located at different locations, and having different column heights 115. These variations are merely illustrative examples, and are not to limiting with respect to the location of these sensors or having any particular column height.

FIGS. 1 and 2 show the vertical pipe emptying into the vessel 104 and the pump 108 pumping from the same vessel 104. In other examples, the vertical pipe may empty into a different vessel than the pump 108 is configured to pump from.

FIGS. 1 and 2 show connections between the processor 116 and various components. However, not all connections are shown to avoid cluttering the drawing. The processor 116 may be in communication with, for example, the pressure sensor 102, the temperature sensor 113, the sensor valve 120, the calibration valve 122, and/or the pressure regulator 110. In some examples, the processor 116 may be in communication with memory (not shown). The processor 116 may also be in communication with additional elements, such as a display (not shown). Examples of the processor 116 may include a general processor, a central processing unit, a microcontroller, a server, an application specific integrated circuit (ASIC), a digital signal processor, a field programmable gate array (FPGA), a programmable logic controller (PLC), a digital circuit, and/or an analog circuit.

The processor 116 may be one or more devices operable to execute logic. The logic may include computer executable instructions or computer code embodied in the memory or in other memory that when executed by the processor 116, cause the processor to perform the features implemented by the logic. The computer code may include instructions executable with the processor 116.

The logic shown in the table may include additional, different, or fewer operations than described. The operations may be executed in a different order than described.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

At least one actuated valve pulses open and closed to allow the process solution to fill a fixed column height with the process solution.

Column pressure is measured after the process valve closes for obtaining a static measurement of the column height pressure.

The process solution pressure in column height tube may be compared to a known solution density in the same tube. The change in column height pressure is directly related to a change in density given a constant temperature.

The sensor system may address temperature compensation. The calibration and process solution temperatures may be measured in order to correctly temperature compensate the K factor of the known reference solution and the K factor of the process solution.

There may be an actuated valve for the reference solution for an automated calibration procedure and/or process. Alternatively or in addition, the valve may be manually turned on and/or off.

What is claimed is:

1. A sensor system for detecting a density and/or a concentration of a brine solution flowing in a conduit, the sensor system comprising:
    a vertical pipe having a top and a bottom, the bottom of the vertical pipe in liquid communication with the conduit such that a diverted portion of the brine solution is received at the bottom of the vertical pipe from the conduit, and the top of the vertical pipe at atmospheric pressure;
    a pressure sensor to detect a pressure of the brine solution in the vertical pipe and a pressure of a reference solution in the vertical pipe; and
    processor circuitry configured to determine the density and/or the concentration of the brine solution based on the detected pressure of the brine solution filled to a fixed column height in the vertical pipe and a property of the reference solution, the property of the reference solution comprising the detected pressure of the reference solution filled to the fixed column height in the vertical pipe.

2. The sensor system of claim 1 further comprising a temperature sensor to detect a temperature of the brine solution, wherein the processor circuitry is configured to determine the density and/or the concentration of the brine solution based on the detected pressure of the brine solution, the detected temperature of the brine solution, and the property of the reference solution.

3. The sensor system of claim 2, wherein the property of the reference solution is a density of the reference solution at the pressure and the temperature of the brine solution.

4. The sensor system of claim 1, wherein the property of the reference solution is a K factor of the reference solution, which is Kp/[1−(Kt−Kb)*Ke], wherein Kp and Kt are a pressure and a temperature of the reference solution in the vertical pipe detected during a calibration phase, and wherein Ke is a coefficient of expansion of the reference solution at a predetermined temperature Kb.

5. The sensor system of claim 1 further comprising a sensor valve disposed between the conduit and the bottom of the vertical pipe to selectively turn a flow of the diverted portion of the brine solution to the vertical pipe on or off, wherein the processor circuitry is configured to cause the sensor valve to shut off and, after a delay, to detect the pressure of the brine solution in the vertical pipe.

6. The sensor system of claim 1 further comprising a pressure regulator and an orifice that has a smaller width than the width of an outlet of the pressure regulator, wherein the pressure regulator and the orifice are located in a flow path between the conduit and the vertical pipe, the orifice downstream of the pressure regulator, and wherein the pressure regulator and the orifice cause the diverted portion of the brine solution to flow through the vertical pipe at a substantially fixed flow rate.

7. The sensor system of claim 1, wherein the reference solution is water.

8. The sensor system of claim 1 further comprising a sensor valve and a calibration valve, the sensor valve disposed between the conduit and the bottom of the vertical pipe to selectively turn a flow of the diverted portion of the brine solution to the vertical pipe on or off, the calibration valve to selective turn a flow of a reference solution to the vertical pipe on or off, wherein the processor circuitry is configured to calibrate the sensor system by causing the sensor valve to shut off and the calibration valve to turn on, wherein the processor circuitry is configured to determine a k factor of the reference solution based on a detected pressure of the reference solution in the vertical pipe.

9. A method to detect a density and/or a concentration of a brine solution flowing in a conduit, the method comprising:
  receiving a diverted portion of the brine solution from the conduit at a vertical pipe, the vertical pipe having a top and a bottom, wherein the diverted portion of the brine solution is received at the bottom of the vertical pipe and the top of the vertical pipe is at atmospheric pressure;
  detecting, by a pressure sensor, a pressure of the brine solution in the vertical pipe and a pressure of a reference solution in the vertical pipe; and
  determining, by processor circuitry, the density and/or the concentration of the brine solution based on the detected pressure of the brine solution filled to a fixed column height in the vertical pipe and a property of the reference solution, the property of the reference solution comprising the detected pressure of the reference solution filled to the fixed column height in the vertical pipe.

10. The method of claim 9 further comprising detecting, by a temperature sensor, a temperature of the brine solution, wherein determining the density and/or the concentration of the brine solution is based on the detected pressure of the fixed column height of the brine solution, the detected temperature of the brine solution, and the property of the reference solution.

11. The method of claim 10, wherein the property of the reference solution is a density of the reference solution at the pressure and the temperature of the brine solution.

12. The method of claim 9, wherein the property of the reference solution is a K factor of the reference solution, which is Kp/[1−(Kt−Kb)*Ke], wherein Kp and Kt are a pressure and a temperature of the reference solution in the vertical pipe detected during a calibration phase, and wherein Ke is a coefficient of expansion of the reference solution at a predetermined temperature Kb.

13. The method of claim 9 further comprising causing a flow of the diverted portion of the brine solution to the vertical pipe to shut off and, delaying a predetermined time period after the flow is shut off before detecting the pressure of the brine solution left in the vertical pipe.

14. The method of claim 9 further comprising causing the diverted portion of the brine solution to flow through the vertical pipe at a substantially fixed flow rate.

15. The method of claim 9, wherein the reference solution is water.

16. The method of claim 9 further comprising filling the vertical pipe with the reference solution by shutting a sensor valve off and turning a calibration valve on; turning the calibration valve off after the vertical pipe is filled with reference solution; detecting a pressure and a temperature of the reference solution in the vertical pipe; determining the property of the reference solution based on a detected pressure and detected temperature of the reference solution in the vertical pipe.

17. A sensor system for detecting a density and/or a concentration of a brine solution flowing in a conduit, the sensor system comprising:
  a vertical pipe having a top and a bottom, the bottom of the vertical pipe in liquid communication with the conduit such that a diverted portion of the brine solution is received at the bottom of the vertical pipe from the conduit, the top of the vertical pipe at atmospheric pressure;
  a sensor valve disposed between the conduit and the bottom of the vertical pipe to selectively turn a flow of the diverted portion of the brine solution to the vertical pipe on or off;
  a pressure sensor to detect a pressure of the brine solution in the vertical pipe and a pressure of a reference solution in the vertical pipe;
  a temperature sensor to detect a temperature of the brine solution in the vertical pipe; and
  processor circuitry configured to:
    cause the sensor valve to shut off,
    delay after shutting the sensor valve off,
    detect the pressure and the temperature of the brine solution filled to a fixed column height in the vertical pipe after the delay, and
    determine the density and/or the concentration of the brine solution based on the detected pressure, the detected temperature, and a density of the reference solution.

18. The sensor system of claim 17, wherein the density of the reference solution affects a k factor on which a determination of the density and/or the concentration of the brine solution is based.

19. The sensor system of claim 18 further comprising a sensor valve and a calibration valve, the sensor valve disposed between the conduit and the bottom of the vertical pipe to selectively turn a flow of the diverted portion of the brine solution to the vertical pipe on or off, the calibration valve controlled by the processor circuitry to selective turn a flow of a reference solution to the vertical pipe on or off, wherein the processor circuitry is configured to calibrate the sensor system by causing the sensor valve to turn off and the calibration valve to turn on, wherein the processor circuitry is configured to determine the k factor based on a detected temperature and a detected pressure of the reference solution in the vertical pipe.

20. The method of claim 9 further comprising the step of filling the vertical pipe with the brine solution to the fixed column height of the brine solution.

\* \* \* \* \*